United States Patent
Zhou et al.

(10) Patent No.: US 11,459,467 B2
(45) Date of Patent: Oct. 4, 2022

(54) WATERBORNE SELF-POLISHING ANTIFOULING PAINT AND PREPARATION METHOD AND APPLICATION THEREOF

(71) Applicant: Lanzhou Institute of Chemical Physics, Chinese Academy of Sciences, Lanzhou (CN)

(72) Inventors: Feng Zhou, Lanzhou (CN); Xiaowei Pei, Lanzhou (CN); Wufang Yang, Lanzhou (CN); Hui Liu, Lanzhou (CN); Jianbin Zhang, Lanzhou (CN)

(73) Assignee: Lanzhou Institute of Chemical Physics, Chinese Academy of Sciences, Lanzhou (CN)

( * ) Notice: Subject to any disclaimer, the term of this patent is extended or adjusted under 35 U.S.C. 154(b) by 333 days.

(21) Appl. No.: 16/860,469

(22) Filed: Apr. 28, 2020

(65) Prior Publication Data
US 2021/0087411 A1    Mar. 25, 2021

(30) Foreign Application Priority Data
Sep. 19, 2019  (CN) .......................... 201910885153.1

(51) Int. Cl.
*C09D 5/16* (2006.01)
*C08F 220/18* (2006.01)
(Continued)

(52) U.S. Cl.
CPC .......... *C09D 5/1687* (2013.01); *C08F 212/08* (2013.01); *C08F 218/08* (2013.01); *C08F 220/1804* (2020.02); *C08F 220/20* (2013.01); *C08F 226/06* (2013.01); *C08K 3/08* (2013.01); *C08K 3/22* (2013.01); *C08K 3/26* (2013.01); *C08K 3/30* (2013.01); *C08K 3/34* (2013.01);
(Continued)

(58) Field of Classification Search
None
See application file for complete search history.

(56) References Cited

U.S. PATENT DOCUMENTS

| | | | |
|---|---|---|---|
| 6,235,104 B1* | 5/2001 | Chattopadhyay | ......... C09C 1/62 106/404 |
| 7,989,521 B1* | 8/2011 | Mori | .................... C09D 5/1612 524/588 |

(Continued)

*Primary Examiner* — Satya B Sastri
(74) *Attorney, Agent, or Firm* — Crowe & Dunlevy; Jeremy B. Berman

(57) ABSTRACT

The present invention provides a waterborne self-polishing antifouling paint and a preparation method and application thereof, and belongs to the technical field of marine antifouling paints. The waterborne self-polishing antifouling paint provided by the present invention includes the following components in parts by weight: 30-60 parts of waterborne self-polishing emulsion, 30-70 parts of waterborne slurry, 0.1-0.5 parts of waterborne leveling agent, 0.2-1 parts of waterborne defoamer, 0.5-1 parts of film-forming additive and 10-20 parts of water. The waterborne self-polishing antifouling paint provided by the present invention has an ultra-low content of volatile organic compounds (VOCs) (less than 20 g/L), and is environmentally friendly. The waterborne self-polishing antifouling paint can be formed into a paint film with good mechanical properties, stable self-polishing rate, and excellent water immersion resistance and antifouling performance.

17 Claims, 2 Drawing Sheets

(51) Int. Cl.

| | |
|---|---|
| *C08F 212/08* | (2006.01) |
| *C08F 218/08* | (2006.01) |
| *C08F 220/20* | (2006.01) |
| *C08F 226/06* | (2006.01) |
| *C08K 3/08* | (2006.01) |
| *C08K 3/22* | (2006.01) |
| *C08K 3/26* | (2006.01) |
| *C08K 3/30* | (2006.01) |
| *C08K 3/34* | (2006.01) |
| *C08K 5/06* | (2006.01) |
| *C08K 5/18* | (2006.01) |
| *C08K 5/3432* | (2006.01) |
| *C08K 5/46* | (2006.01) |
| *C08K 5/56* | (2006.01) |
| *C08L 1/02* | (2006.01) |
| *C08L 93/04* | (2006.01) |
| *C09D 17/00* | (2006.01) |

(52) U.S. Cl.
CPC .............. *C08K 5/06* (2013.01); *C08K 5/18* (2013.01); *C08K 5/3432* (2013.01); *C08K 5/46* (2013.01); *C08K 5/56* (2013.01); *C08L 1/02* (2013.01); *C08L 93/04* (2013.01); *C09D 5/1618* (2013.01); *C09D 5/1625* (2013.01); *C09D 17/001* (2013.01); *C08K 2003/085* (2013.01); *C08K 2003/2248* (2013.01); *C08K 2003/2265* (2013.01); *C08K 2003/2296* (2013.01); *C08K 2003/265* (2013.01); *C08K 2003/3045* (2013.01)

(56) References Cited

U.S. PATENT DOCUMENTS

| | | | |
|---|---|---|---|
| 8,038,832 B2 * | 10/2011 | Tanaka | C08F 265/06 |
| | | | 156/325 |
| 9,105,372 B2 * | 8/2015 | Gane | C09D 5/24 |
| 10,364,370 B1 * | 7/2019 | Takao | C09D 143/04 |
| 2003/0119948 A1 * | 6/2003 | Kelly | C09D 133/08 |
| | | | 524/35 |
| 2012/0202076 A1 * | 8/2012 | Ehara | B63B 59/04 |
| | | | 524/270 |
| 2021/0163758 A1 * | 6/2021 | Andrés Martinez | |
| | | | C09D 133/10 |

* cited by examiner

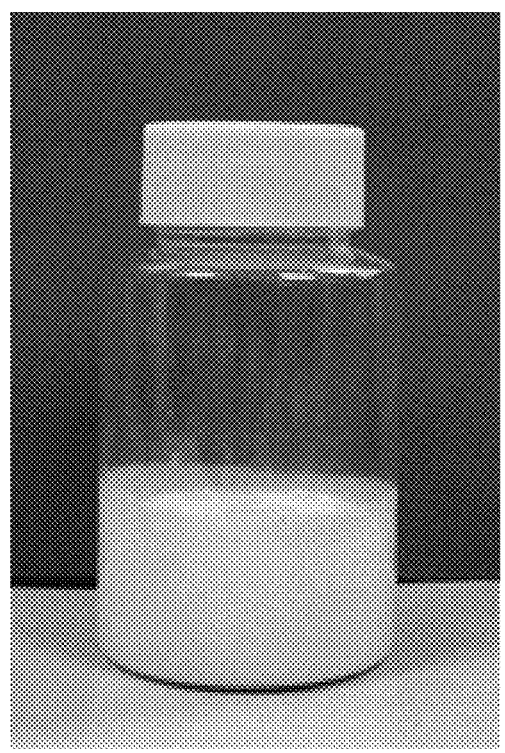
FIG. 1
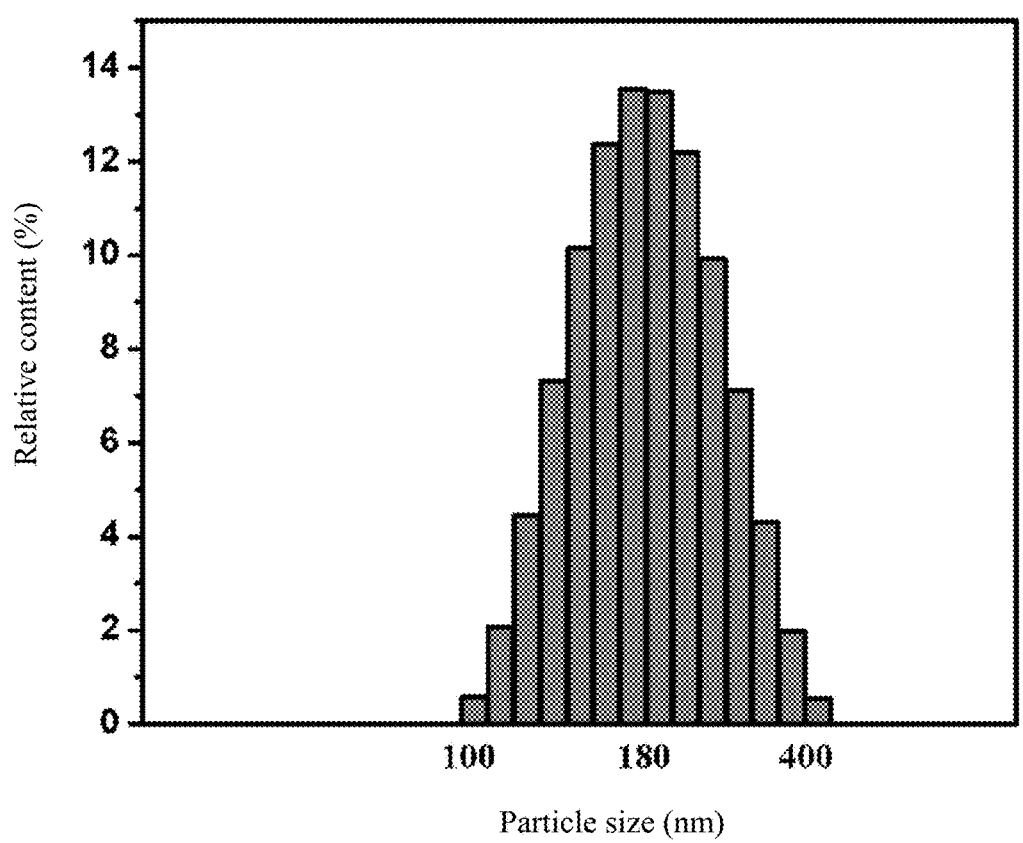

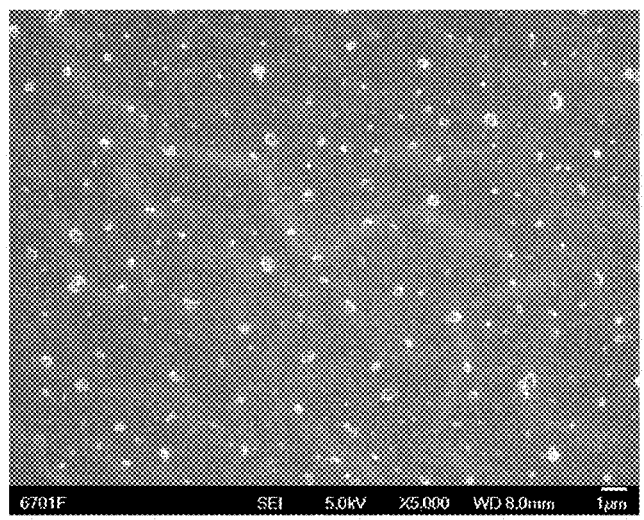
FIG. 3
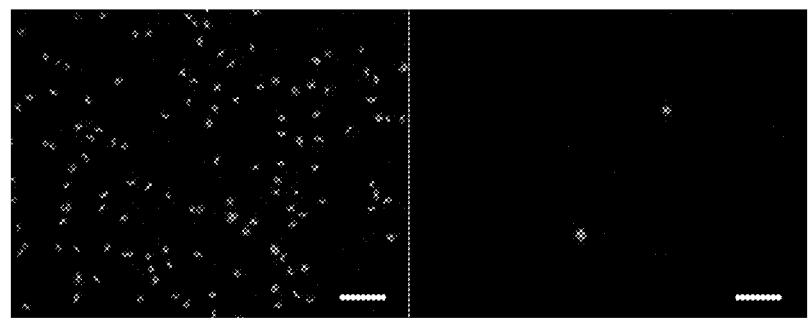
FIG. 4
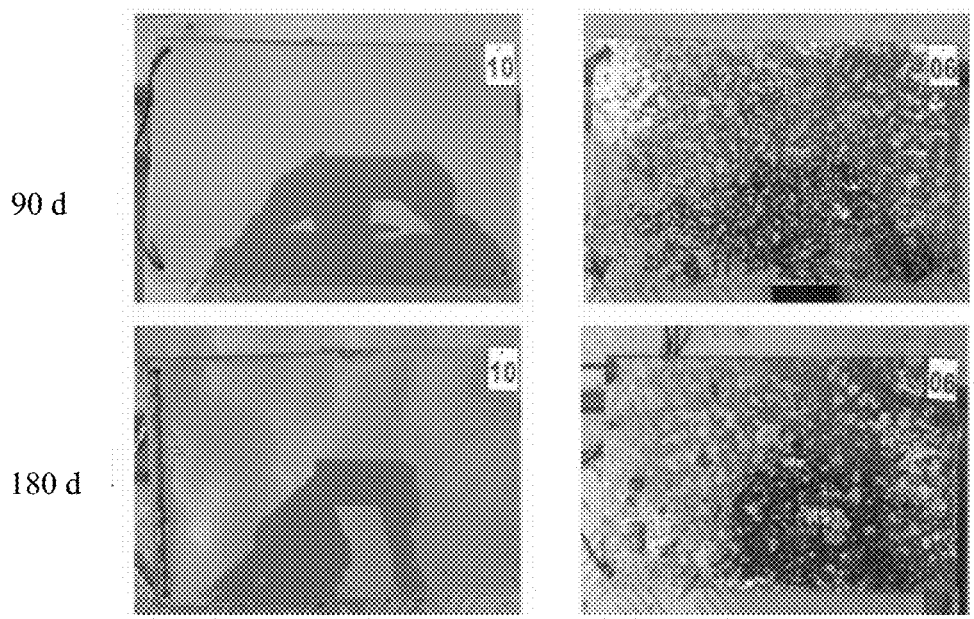

WATERBORNE SELF-POLISHING ANTIFOULING PAINT AND PREPARATION METHOD AND APPLICATION THEREOF

PRIORITY CLAIM

This application claims the priority benefit of Chinese Application for Patent No. 201910885153.1, filed on Sep. 19, 2019, the content of which is hereby incorporated by reference in its entirety to the maximum extent allowable by law.

TECHNICAL FIELD

This disclosure relates to the technical field of marine antifouling paints, and in particular, to a waterborne self-polishing antifouling paint and a preparation method and application thereof.

BACKGROUND

In the process of developing the oceans, human beings have been facing the problem of preventing the attachment of marine fouling organisms to ships and marine equipment. Among many available antifouling techniques, the use of antifouling paints in coating surfaces that will be submerged is the most cost-effective. However, the commonly-used solvent-based antifouling paints can release a large amount of organic solvents during the coating process, which affects the health of operators and pollutes the environment. Therefore, it is necessary to develop environmentally friendly waterborne self-polishing antifouling paints.

At present, there are only a few mature waterborne self-polishing antifouling paints, which are mostly used in cage culture. Such waterborne self-polishing antifouling paints use waterborne resins as a film-forming agent, and the antifouling period provided thereby is short. Some waterborne self-polishing antifouling paints are based on waterborne emulsions, but they do not have self-polishing properties although the content of the volatile organic compounds (VOC) is low. Some other waterborne self-polishing antifouling paints are based on water-soluble self-polishing resins, which often react to form salts through acrylic acid and amine compounds in the main chain to improve water solubility. However, since there are still many organic solvents in the resin, and the VOC content is still high, these resin-based paints are pseudo-waterborne. In addition, due to the presence of ammonium acrylate, the paint film formed has poor water resistance and is not suitable for long-term immersion.

As such, further development to address the drawbacks of existing formulations is still needed.

SUMMARY

An objective is to provide a waterborne self-polishing antifouling paint, a method for preparing the waterborne self-polishing antifouling paint, and uses for the waterborne self-polishing antifouling paint. The waterborne self-polishing antifouling paint described herein has an ultra-low content of volatile organic compounds (VOC) (less than 20 g/L), and is environmentally friendly. The waterborne self-polishing antifouling paint can be formed into a paint film with good mechanical properties, a stable self-polishing rate, and excellent water immersion resistance and antifouling performance.

To achieve the above purpose, this disclosure provides the following technical solutions.

A waterborne self-polishing antifouling paint includes the following components in parts by weight:

30-60 parts of waterborne self-polishing emulsion, 30-70 parts of waterborne slurry, 0.1-0.5 parts of waterborne leveling agent, 0.2-1 parts of waterborne defoamer, 0.5-1 parts of film-forming additive and 10-20 parts of water, wherein the waterborne self-polishing emulsion includes the following raw materials in percent by mass:

5-30% of silicone acrylate monomer, 10-40% of vinyl unsaturated monomer, 0.2-2% of acrylic acid, 5-20% of rosin, 0.1-1% of initiator, 0.5-3% of emulsifier, 0.01-0.1% of sodium bicarbonate, 0.1-1% of pH adjuster, and the balance being water;

and wherein the waterborne slurry is prepared with an antifouling agent, a pigment/filler, an organic bentonite, a thickener, a waterborne wetting and dispersing agent, and water, and wherein the antifouling agent, the pigment/filler, the organic bentonite, the thickener, the waterborne wetting and dispersing agent, and the water have a mass ratio of (40-60):(5-10):(3-4):(0.5-1):(0.5-1):(30-40).

The silicon acrylate monomer may include silicon triisopropylmethacrylate and/or silicon triisopropylacrylate; and the vinyl unsaturated monomer may include at least one of methyl methacrylate, butyl acrylate, butyl methacrylate, hydroxyethyl methacrylate, styrene, vinyl acetate and vinylpyridine.

The waterborne self-polishing emulsion may have a pH of 6-8; and an emulsion particle in the waterborne self-polishing emulsion may have an average particle size of 150-200 nm.

The waterborne self-polishing emulsion may be prepared by:

mixing the silicone acrylate monomer, the vinyl unsaturated monomer, the acrylic acid, the rosin and the emulsifier with a first part of water to yield a component A;

mixing the initiator with a second part of water to yield a component B;

mixing the sodium bicarbonate, the remaining water, a part of the component A and a part of the component B to yield a first reaction solution, and subjecting the first reaction solution to a first emulsion polymerization reaction to yield a seed emulsion; and adding the remaining component A and the remaining component B dropwise to the seed emulsion to yield a second reaction solution, performing a second emulsion polymerization reaction to yield a system, and then adding the pH adjuster to the system to yield the waterborne self-polishing emulsion.

The waterborne slurry may have a fineness of ≤50 μm.

The antifouling agent may include a main antifouling agent and an auxiliary antifouling agent; the main antifouling agent may be cuprous oxide and/or copper powder; the auxiliary antifouling agent may be one of more of copper pyrithione (CuPT), zinc pyrithione (ZPT), 4,5-dichloro-2-n-octyl-4-isothiazolin-3-one, diuron and zineb;

the pigment/filler may include one or more of iron oxide red, zinc oxide, calcium carbonate, barium sulfate, mica powder, quartz powder and talc powder;

the thickener may include a DeuRheo WT-105A thickener and hydroxyethyl cellulose; and the waterborne wetting and dispersing agent may include one or more of waterborne wetting and dispersing agents AC 8892, BYK156 and BYK152.

The waterborne slurry may be prepared by:

mixing the antifouling agent, the pigment/filler, the organic bentonite, the thickener, the waterborne wetting and dispersing agent, and the water, and ball-milling to yield the waterborne slurry.

The waterborne leveling agent may include at least one of waterborne leveling agents WCT 2490, BYK375 and DC57;

the waterborne defoamer may include at least one of waterborne defoamers DA PRO AP7010, BYK025 and DC65; and the film-forming additive may include ethylene glycol ethyl ether and/or ethylene glycol butyl ether.

A method for preparing the above waterborne self-polishing antifouling paint includes:

mixing the waterborne self-polishing emulsion, the waterborne slurry, the waterborne leveling agent, the waterborne defoamer, the film-forming additive, and the water to yield the waterborne self-polishing antifouling paint.

This disclosure also envisions and provides an application of the above waterborne self-polishing antifouling agent or a waterborne self-polishing antifouling agent prepared by the above method as a marine antifouling paint.

This disclosure also provides a waterborne self-polishing antifouling paint, including the following components in parts by weight: 30-60 parts of waterborne self-polishing emulsion, 30-70 parts of waterborne slurry, 0.1-0.5 parts of waterborne leveling agent, 0.2-1 parts of waterborne defoamer, 0.5-1 parts of film-forming additive, and 10-20 parts of water, where the waterborne self-polishing emulsion includes the following raw materials in percent by mass: 5-30% of silicone acrylate monomer, 10-40% of vinyl unsaturated monomer, 0.2-2% of acrylic acid, 5-20% of rosin, 0.1-1% of initiator, 0.5-3% of emulsifier, 0.01-0.1% of sodium bicarbonate, 0.1-1% of pH adjuster, and the balance being water; wherein the waterborne slurry is prepared with an antifouling agent, a pigment/filler, an organic bentonite, a thickener, a waterborne wetting and dispersing agent, and water, and wherein the antifouling agent, the pigment/filler, the organic bentonite, the thickener, the waterborne wetting and dispersing agent, and the water have a mass ratio of (40-60):(5-10):(3-4):(0.5-1):(0.5-1):(30-40).

After the waterborne self-polishing antifouling paint described herein is formed into a paint film, the silicon acrylate on the surface of the paint film is hydrolyzed in seawater and peeled off under the action of seawater shearing to achieve self-polishing of the surface and exhibit good self-renewal ability. In the waterborne self-polishing antifouling paint described herein, the rosin exists in the form of emulsion drop/micelle under the synergistic effect of the components. The emulsion drop/micelle is uniformly distributed in the paint film through a film formation process, and slowly dissolved in alkaline seawater to form a microchannel, which facilitates the antifouling agent to seep out to achieve excellent antifouling performance. In addition, the waterborne self-polishing antifouling paint described herein has an ultra-low VOC content (less than 20 g/L) and does not contain poisons such as tributyltin (TBT), demonstrating environmental friendliness, good film-forming properties, and excellent water immersion resistance. The results of the examples show that after the waterborne self-polishing antifouling paint described herein was formed into a film, the adhesion of the paint film reached class 1, the flexibility reached 1 mm, and the impact resistance was greater than 50 kg·cm. After being immersed in artificial seawater for 30 d, the paint film did not blister or fall off, and the self-polishing rate of the paint film was stable, which was about 0.26-0.35 μm/d on average. After 180 d in a static seawater immersion test, the surface of the paint film was still clean and showed excellent anti-fouling characteristics.

BRIEF DESCRIPTION OF DRAWINGS

FIG. 1 is an apparent view of a waterborne self-polishing emulsion described in Example 1.

FIG. 2 is an average particle size distribution diagram of an emulsion particle in a waterborne self-polishing emulsion in Example 1.

FIG. 3 is a scanning electron microscope (SEM) image of a waterborne self-polishing emulsion in Example 1.

FIG. 4 is a fluorescence image of *Dunaliella* on a surface of a sample glass slide coated with a waterborne self-polishing antifouling paint in Example 1 and a blank glass slide.

FIG. 5 is a comparison diagram of a static seawater immersion test of an epoxy sample plate coated with a waterborne self-polishing antifouling paint in Example 1 and a blank epoxy plate.

DETAILED DESCRIPTION

Described herein is a waterborne self-polishing antifouling paint, including the following components in parts by weight:

30-60 parts of waterborne self-polishing emulsion, 30-70 parts of waterborne slurry, 0.1-0.5 parts of waterborne leveling agent, 0.2-1 parts of waterborne defoamer, 0.5-1 parts of film-forming additive, and 10-20 parts of water, where the waterborne self-polishing emulsion includes the following raw materials in percent by mass:

5-30% of silicone acrylate monomer, 10-40% of vinyl unsaturated monomer, 0.2-2% of acrylic acid, 5-20% of rosin, 0.1-1% of initiator, 0.5-3% of emulsifier, 0.01-0.1% of sodium bicarbonate, 0.1-1% of pH adjuster, and the balance being water; and where the waterborne slurry is prepared with an antifouling agent, a pigment/filler, an organic bentonite, a thickener, a waterborne wetting and dispersing agent, and water, and the antifouling agent, the pigment/filler, the organic bentonite, the thickener, the waterborne wetting and dispersing agent and the water have a mass ratio of (40-60):(5-10):(3-4):(0.5-1):(0.5-1):(30-40).

The waterborne self-polishing antifouling paint described herein mainly uses the waterborne self-polishing emulsion and the waterborne slurry as raw materials, which are described below.

The waterborne self-polishing emulsion described herein includes the following raw materials in percent by mass:

5-30% of silicone acrylate monomer, 10-40% of vinyl unsaturated monomer, 0.2-2% of acrylic acid, 5-20% of rosin, 0.1-1% of initiator, 0.5-3% of emulsifier, 0.01-0.1% of sodium bicarbonate, 0.1-1% of pH adjuster, and the balance being water.

The waterborne self-polishing emulsion includes 5-30%, preferably 8-18% by mass of silicone acrylate monomer. The silicon acrylate monomer preferably includes silicon triisopropylmethacrylate and/or silicon triisopropylacrylate. The waterborne self-polishing emulsion is used as a film-forming substance of the waterborne self-polishing antifouling paint. After the waterborne self-polishing antifouling paint is formed into a paint film, the silicon acrylate on the surface of the paint film is hydrolyzed in seawater and peeled off under the action of seawater shearing to achieve self-polishing of the surface and exhibit good self-renewal ability.

The waterborne self-polishing emulsion includes 10-40%, preferably 20-30% by mass of vinyl unsaturated monomer. The vinyl unsaturated monomer preferably includes at least one of methyl methacrylate, butyl acrylate, butyl methacrylate, hydroxyethyl methacrylate, styrene, vinyl acetate and vinylpyridine, and more preferably includes one of the following mixtures:

a mixture of butyl acrylate, methyl methacrylate and styrene, where the butyl acrylate, the methyl methacrylate and the styrene have a mass ratio of preferably (25-35):(45-55):(15-18), and more preferably (28-30):(47-50):(16-17); and a mixture of butyl acrylate, butyl methacrylate, methyl methacrylate, styrene and vinylpyridine, where the butyl acrylate, the butyl methacrylate, the methyl methacrylate, the styrene and the vinylpyridine have a mass ratio of preferably (13-17):(8-12):(48-55):(13-17):(4-6), and more preferably 15:10:51.5:15:5.

The vinyl unsaturated monomer adjusts the glass transition temperature of the waterborne self-polishing emulsion, thereby further improving the physical and chemical properties of the waterborne self-polishing antifouling paint.

The waterborne self-polishing emulsion includes 0.2-2%, preferably 0.3-1% by mass of acrylic acid. The acrylic acid improves the hydrophilicity of an emulsion particle in the waterborne self-polishing emulsion, which improves the dispersion stability of the waterborne self-polishing emulsion, and further ensures that the waterborne self-polishing antifouling paint has good stability.

The waterborne self-polishing emulsion includes 5-20%, preferably 10-15% by mass of rosin. In the waterborne self-polishing emulsion described herein, the rosin exists in the form of emulsion drop/micelle under the synergistic effect of the components. The emulsion drop/micelle is uniformly distributed in the paint film through a film formation process and slowly dissolved in alkaline seawater to form a micro-channel, which facilitates the antifouling agent to seep out.

The waterborne self-polishing emulsion includes 0.1-1%, preferably 0.2-0.5% by mass of initiator. The initiator preferably includes a persulfate-based initiator, and more preferably includes ammonium persulfate or potassium persulfate.

The waterborne self-polishing emulsion includes 0.5-3%, preferably 0.8-1.6% by mass of emulsifier. The emulsifier preferably includes at least one of anionic emulsifier, cationic emulsifier and nonionic emulsifier; the anionic emulsifier preferably includes sodium dodecyl sulfonate and/or sodium dodecylbenzene sulfonate; the cationic emulsifier preferably includes dodecylammonium chloride and/or cetyltrimethylammonium bromide; and the non-ionic emulsifier preferably includes at least one of emulsifier OP-10, emulsifier OP-15 and emulsifier T-20. The emulsifier reduces the surface tension of water and emulsifies the monomer, which improves the storage stability of the waterborne self-polishing antifouling paint.

The waterborne self-polishing emulsion includes 0.01-0.1%, preferably 0.04-0.06% by mass of sodium bicarbonate. The sodium bicarbonate adjusts the pH of the waterborne self-polishing emulsion, which helps to maintain the stability of the waterborne self-polishing emulsion, and further helps to ensure that the waterborne self-polishing antifouling paint has good stability.

The waterborne self-polishing emulsion includes 0.1-1%, preferably 0.2-0.4% by mass of pH adjuster. The pH adjuster preferably includes ammonia water, and the mass concentration of the ammonia water is preferably 25-28%. In addition to the sodium bicarbonate, the pH adjuster is used to adjust the pH of the waterborne self-polishing emulsion, which helps ensure the excellent stability of the waterborne self-polishing emulsion, and further improves the stability of the waterborne self-polishing antifouling paint.

The waterborne self-polishing emulsion includes water as the balance in percent by mass, and the water is preferably deionized water.

The pH of the waterborne self-polishing emulsion is preferably 6-8; the average particle size of the emulsion particle in the waterborne self-polishing emulsion is preferably 150-200 nm; and the total solids content (TSC) of the waterborne self-polishing emulsion is preferably 47.5-48.5 wt % (GB1725-2007).

The waterborne self-polishing emulsion is preferably prepared by:

mixing the silicone acrylate monomer, the vinyl unsaturated monomer, the acrylic acid, the rosin and the emulsifier with a first part of water to yield a component A;

mixing the initiator with a second part of water to yield a component B;

mixing the sodium bicarbonate, the remaining water, a part of the component A and a part of the component B to yield a first reaction solution, and subjecting the first reaction solution to a first emulsion polymerization reaction to yield a seed emulsion; and adding the remaining component A and the remaining component B dropwise to the seed emulsion to yield a second reaction solution, performing a second emulsion polymerization reaction to yield a system, and then adding the pH adjuster to the system to yield the waterborne self-polishing emulsion.

The silicone acrylate monomer, the vinyl unsaturated monomer, the acrylic acid, the rosin and the emulsifier are mixed with a first part of water to yield a component A. The first part of water preferably accounts for 73-78%, and more preferably 75% of the total mass of water. The silicon acrylate monomer, the vinyl unsaturated monomer, the acrylic acid, the rosin and the emulsifier are mixed with the first part of water. Preferably, the silicon acrylate monomer, the vinyl unsaturated monomer and the acrylic acid are stirred well. Then, the rosin is added, stirred and dissolved until a transparent solution is yielded. Finally, the emulsifier and the first part of water are added and stirred at 30-40° C. for 30-60 min to yield the component A.

The initiator is mixed with a second part of water to yield a component B. The second part of water preferably accounts for 13-17%, and more preferably 15% of the total mass of water. There is no special limit on the mixing of the initiator with the second part of water, as long as the initiator and the second part of water can be mixed thoroughly.

After the component A and the component B are yielded, the sodium bicarbonate, the remaining water, a part of the component A and a part of the component B are mixed to yield a first reaction solution. The first reaction solution is subjected to a first emulsion polymerization reaction to yield a seed emulsion. The part of the component A preferably accounts for 25-35%, more preferably 30% of the total mass of the component A; the part of the component B preferably accounts for 12-17%, more preferably 15% of the total mass of the component B. The sodium bicarbonate, the remaining water, the part of the component A and the part of the component B are mixed. Preferably, the sodium bicarbonate, the remaining water and the part of the component A are stirred at 30-40° C. for 25-35 min, and then the part of the component B is added.

The first emulsion polymerization reaction is preferably: the reaction of the first reaction solution is performed under stirring at 80-81° C. for 70-120 min. Specifically, during the first emulsion polymerization reaction, the reaction is performed under stirring at 80-81° C. for 40-60 min till a system turns blue, and then the reaction is continuously performed under stirring at 80-81° C. for 30-60 min.

After the seed emulsion is yielded, the remaining component A and the remaining component B are added dropwise to the seed emulsion to yield a second reaction solution. A second emulsion polymerization reaction is performed to yield a system, and then the pH adjuster is added to the system to yield the waterborne self-polishing emulsion. The remaining component A and the remaining component B are added dropwise to the seed emulsion. Preferably, the heating temperature is maintained at 80-81° C., and the remaining component A is added dropwise to the seed emulsion, and the addition is completed within 2 h. During this period, the remaining component B is continuously added in batches.

The second emulsion polymerization reaction is preferably: the second reaction solution is reacted at 80-81° C. for 50-70 min, and then at 87-89° C. for 50-70 min.

After the second emulsion polymerization is completed, the temperature of the yielded system is preferably lowered to 50-55° C., and then the pH adjuster is added dropwise into the system to adjust the pH of the system in the range of 6-8 to yield the waterborne self-polishing emulsion.

The waterborne self-polishing emulsion described herein is completely waterborne and does not contain VOC and poisons such as TBT. The emulsion particle in the waterborne self-polishing emulsion has uniform particle size, excellent stability, good film-forming properties, and excellent water immersion resistance. The waterborne self-polishing emulsion is environmentally friendly, has a simple preparation method and convenient construction, and thus is suitable for industrial production and application.

The waterborne slurry is prepared with an antifouling agent, a pigment/filler, an organic bentonite, a thickener, a waterborne wetting and dispersing agent and water, and the antifouling agent, the pigment/filler, the organic bentonite, the thickener, the waterborne wetting and dispersing agent and the water have a mass ratio of (40-60):(5-10):(3-4):(0.5-1):(0.5-1):(30-40), and preferably (45-55):(6-9):(3.3-3.8):(0.6-0.8):(0.6-0.9):(33-37). The TSC of the waterborne slurry is preferably 60-65 wt % (GB1725-2007), and the fineness of the waterborne slurry is preferably ≤50 μm.

The antifouling agent preferably includes a main antifouling agent and an auxiliary antifouling agent, which have a mass ratio of preferably (5-7):1, and more preferably 6:1. The main antifouling agent is preferably cuprous oxide and/or copper powder, and more preferably cuprous oxide or copper powder. The auxiliary antifouling agent is preferably one of more of copper pyrithione (CuPT), zinc pyrithione (ZPT), 4,5-dichloro-2-n-octyl-4-isothiazolin-3-one, diuron and zineb, and more preferably at least two of CuPT, ZPT, 4,5-dichloro-2-n-octyl-4-isothiazolin-3-one, diuron and zineb, for example, a mixture of diuron and zineb, or a mixture of CuPT and 4,5-dichloro-2-n-octyl-4-isothiazolin-3-one. When the auxiliary antifouling agent is a mixture of two or more of the above components, there is no special limit on the proportion of the components. The antifouling agent is gradually released from the paint film to expel a fouling organism attached to the surface of the paint film, improving the antifouling effect of the paint.

The pigment/filler preferably includes one or more of iron oxide red, zinc oxide, calcium carbonate, barium sulfate, mica powder, quartz powder and talc powder, and more preferably at least three of iron oxide red, oxide zinc, calcium carbonate, barium sulfate, mica powder, quartz powder and talc powder, for example, a mixture of iron oxide red, zinc oxide and barium sulfate, or a mixture of iron oxide red, zinc oxide and talc powder. When the pigment/filler is a mixture of three or more components, there is no special limit on the proportion of the components. In the present invention, the pigment/filler increases the volume of the paint, adjusts the glossiness, and helps reduce the cost.

The thickener preferably includes a DeuRheo WT-105A thickener and hydroxyethyl cellulose, and the DeuRheo WT-105A thickener and hydroxyethyl cellulose have a mass ratio of preferably (18-22):1, more preferably 20:1. The thickener increases the viscosity of the paint, prevents sagging during construction, and helps improve the coating performance of the paint.

The waterborne wetting and dispersing agent preferably includes one or more of waterborne wetting and dispersing agents AC 8892, BYK156 and BYK152, and more preferably a waterborne wetting and dispersing agent AC 8892, BYK156 or BYK152. The waterborne wetting and dispersing agent improves the interfacial effect of the antifouling agent, the pigment/filler and the emulsion, and improves the dispersion stability of the antifouling agent and the pigment/filler in the paint.

There is no special limit on the water used for preparing the waterborne slurry, and deionized water is preferably used.

The waterborne slurry is preferably prepared by:
mixing the antifouling agent, the pigment/filler, the organic bentonite, the thickener, the waterborne wetting and dispersing agent and the water, and ball-mill to yield the waterborne slurry.

The antifouling agent, the pigment/filler, the organic bentonite, the thickener, the waterborne wetting and dispersing agent, and the water are mixed. Preferably, the thickener, the waterborne wetting and dispersing agent, and the water are stirred at 300-400 r/min for 10-20 min. Then the antifouling agent, the pigment/filler and the organic bentonite are added in this order, and stirred and dispersed at 800-1000 r/min for 25-35 min. There is no special limit on the ball-milling, as long as the fineness of the yielded waterborne slurry is ≤50 μm.

The waterborne self-polishing emulsion and the waterborne slurry are used as main materials, and the waterborne leveling agent, the waterborne defoamer, the film-forming additive and the water are used as auxiliary materials. The yielded waterborne self-polishing antifouling paint has an ultra-low VOC content (less than 20 g/L) and does not contain poisons such as TBT. It is environmentally friendly and has excellent water immersion resistance. The waterborne self-polishing antifouling paint is described below.

In parts by weight, the waterborne self-polishing antifouling paint described herein includes 30-60 parts waterborne self-polishing emulsion, preferably 35-55 parts, and more preferably 40-50 parts.

Based on the parts by weight of the waterborne self-polishing emulsion, the waterborne self-polishing antifouling paint described herein includes 30-70 parts waterborne slurry, preferably 35-60 parts, and more preferably 40-50 parts.

Based on the parts by weight of the waterborne self-polishing emulsion, the waterborne self-polishing antifouling paint described herein includes 0.1-0.5 parts waterborne leveling agent, preferably 0.2-0.4 parts, and more preferably 0.2-0.3 parts. The waterborne leveling agent preferably includes at least one of waterborne leveling agents WCT 2490, BYK375 and DC57, and more preferably a waterborne leveling agent WCT 2490, BYK375 or DC57. The waterborne leveling agent prevents shrinkage of the paint film, and improves the leveling performance of the paint film.

Based on the parts by weight of the waterborne self-polishing emulsion, the waterborne self-polishing antifouling paint includes 0.2-1 parts waterborne defoamer, preferably 0.3-0.7 parts, and more preferably 0.5-0.6 parts. The waterborne defoamer preferably includes at least one of waterborne defoamers DA PRO AP7010, BYK025 and DC65, and more preferably a waterborne defoamer DA PRO AP7010, BYK025 or DC65. The waterborne defoamer eliminates an air bubble in the paint, and improves the appearance of the paint film and the construction performance of the paint.

Based on the parts by weight of the waterborne self-polishing emulsion, the waterborne self-polishing antifouling paint includes 0.5-1 parts film-forming additive, preferably 0.6-0.9 parts, and more preferably 0.7-0.8 parts. The film-forming additive preferably includes ethylene glycol ethyl ether and/or ethylene glycol butyl ether, and more preferably ethylene glycol ethyl ether or ethylene glycol butyl ether. The film-forming additive improves the film-forming property of the paint and facilitates low-temperature construction.

Based on the parts by weight of the waterborne self-polishing emulsion, the waterborne self-polishing antifouling paint described herein includes 10-20 parts water, preferably 13-18 parts, and more preferably 15-17 parts. There is no special limit on the type of the water, and deionized water is preferably used.

The total solid content (TSC) of the waterborne self-polishing antifouling paint is preferably 45-48 wt % (GB1725-2007).

Also disclosed herein is a method for preparing the waterborne self-polishing antifouling paint according to the above technical solution, including:

mixing the waterborne self-polishing emulsion, the waterborne slurry, the waterborne leveling agent, the waterborne defoamer, the film-forming additive, and the water to yield the waterborne self-polishing antifouling paint.

The waterborne self-polishing emulsion, the waterborne slurry, the waterborne leveling agent, the waterborne defoamer, the film-forming additive, and the water are mixed. Preferably, the waterborne self-polishing emulsion, the waterborne slurry, the film-forming additive, and the water are stirred and dispersed at 250-300 r/min for 25-35 min to yield a mixture. Then the waterborne leveling agent and the waterborne defoamer are slowly added to the mixture under stirring at 150-200 r/min. After the addition is completed, the stirring and dispersing are continuously performed for 25-35 min. There is no special limit on the addition rate of the waterborne leveling agent and the waterborne defoamer, and conventional operations in the art can be adopted. After the above mixing process is completed, a yielded system is preferably filtered to yield a waterborne self-polishing antifouling paint. There is no special limit on the filtration, and a filtration method well known to those skilled in the art can be adopted.

Envisioned and within the scope of this disclosure is a use of the waterborne self-polishing antifouling agent according to the above technical solution or a waterborne self-polishing antifouling agent prepared by the method according to the above technical solution as a marine antifouling paint. The marine antifouling paint may be used as a waterborne marine antifouling paint for ships. There is no special limit on the application method of the marine antifouling agent, and application methods well known to those skilled in the art can be adopted.

The technical solutions presented in this disclosure are clearly and completely described below with reference to examples thereof. Apparently, the described examples are merely some rather than all possible examples of the waterborne self-polishing antifouling agent. All other examples obtained by a person of ordinary skill in the art based on the examples provided herein without creative efforts are intended to be within the protective scope of this patent application.

Example 1

A waterborne self-polishing emulsion was prepared as follows:

50 g of silicon triisopropylmethacrylate, 30 g of butyl acrylate, 50 g of methyl methacrylate, 16.5 g of styrene, and 2.4 g of acrylic acid were added and stirred well. 50 g of rosin was added, stirred, and dissolved until a transparent solution was yielded. 3 g of non-ionic emulsifier (OP-10), 1.5 g of anionic emulsifier (sodium dodecyl sulfonate) and 150 g of deionized water were added and stirred at 600 r/min and 30° C. for 40 min to yield a component A.

1.4 g of initiator (ammonium persulfate) was added into 20 g of deionized water to dissolve to yield a component B.

0.2 g of sodium bicarbonate, 30 g of deionized water and 100 g of component A were added to a four-necked flask, and stirred at 600 r/min and 30° C. for 30 min. 3.2 g of component B was added, and gradually heated to 81° C. under stirring. After the reaction was allowed to take place for 40 min, a system turned blue. Then the stirring reaction was continued for 40 min to yield a seed emulsion.

The heating temperature was maintained at 81° C., and the remaining component A was added dropwise to the four-necked flask, and the addition was completed within 2 h. During this period, the remaining component B was continuously added in batches. After the components A and B were added, a reaction was incubated for 1 h at 81° C. After that, the temperature was raised to 88° C., and the reaction was further incubated for 1 h. After the reaction was completed, a yielded system was cooled to 55° C. About 0.5-1 g of 25% ammonia water was added dropwise to adjust the pH in the range of 6-8. Finally the solution was filtered to yield the waterborne self-polishing emulsion with a total solids content (TSC) of 48 wt %.

A waterborne slurry was prepared as follows:

38 g of deionized water, 0.5 g of thickener (DeuRheo WT-105A), 0.025 g of hydroxyethyl cellulose, and 0.775 g of waterborne wetting and dispersing agent (BYK156) were added into a dispersion tank and stirred at 300 r/min for 10 min. 44 g of cuprous oxide, 4 g of diuron, 3.5 g of zineb, 6 g of pigment/filler (2 g each of iron oxide red, zinc oxide and barium sulfate), and 3.2 g of organic bentonite were added in this order, and stirred and dispersed at 900 r/min for 30 min to yield a mixture. Then, a QM-3SP2 planetary ball mill was used to ball-mill the mixture until the slurry fineness was less than 50 μm, and the waterborne slurry was yielded with a TSC of 61 wt %.

A waterborne self-polishing antifouling paint was prepared as follows:

37 g of waterborne self-polishing emulsion, 45 g of waterborne slurry, 0.7 g of ethylene glycol butyl ether, and 16.5 g of deionized water were thoroughly stirred and dispersed at 300 r/min for 30 min to yield a mixture. Then, 0.3 g of waterborne leveling agent (WCT 2490) and 0.5 g of waterborne defoamer (DA PRO AP7010) were slowly added to the mixture under stirring at 200 r/min. After the addition, the stirring and dispersing were continuously performed for 30 min. The solution was filtered to yield the waterborne self-polishing antifouling paint with a TSC of 45.6 wt %.

Example 2

A waterborne self-polishing emulsion and a waterborne slurry were prepared according to the method in Example 1.

35 g of waterborne self-polishing emulsion, 48 g of waterborne slurry, 0.6 g of ethylene glycol ethyl ether, and 15.5 g of deionized water were thoroughly stirred and dispersed at 300 r/min for 30 min to yield a mixture. Then, 0.3 g of waterborne leveling agent (BYK375) and 0.6 g of waterborne defoamer (DC65) were slowly added to the mixture under stirring at 200 r/min. After the addition, the stirring and dispersing were continuously performed for 30 min. The solution was filtered to yield the waterborne self-polishing antifouling paint with a TSC of 46.2 wt %.

Example 3

A waterborne self-polishing emulsion was prepared as follows:

55 g of silicon triisopropylmethacrylate, 28 g of butyl acrylate, 47.5 g of methyl methacrylate, 16 g of styrene, and 2.5 g of acrylic acid were added and stirred well. 50 g of rosin was added, stirred and dissolved until a transparent solution was yielded. 3.2 g of non-ionic emulsifier (OP-10), 1.6 g of anionic emulsifier (sodium dodecylbenzene sulfonate) and 150 g of deionized water were added and stirred at 600 r/min and 30° C. for 40 min to yield a component A.

1.4 g of initiator (ammonium persulfate) was added into 20 g of deionized water to dissolve to yield a component B.

0.2 g of sodium bicarbonate, 30 g of deionized water and 100 g of component A were added to a four-necked flask, and stirred at 600 r/min and 30° C. for 30 min. 3.2 g of component B was added, and gradually heated to 81° C. under stirring. After the reaction was allowed to take place for 40 min, the system turned blue. Then the stirring reaction was continued for 40 min to yield a seed emulsion.

The heating temperature was maintained at 81° C., and the remaining component A was added dropwise to the four-necked flask, and the addition was completed within 2 h. During this period, the remaining component B was continuously added in batches. After the components A and B were added, a reaction was incubated for 1 h at 81° C. After that, the temperature was raised to 88° C., and the reaction was further incubated for 1 h. After the reaction was completed, a yielded system was cooled to 55° C. About 0.5-1 g of 25% ammonia water was added dropwise to adjust the pH in the range of 6-8. Finally the solution was filtered to yield the waterborne self-polishing emulsion with a TSC of 47.8 wt %.

A waterborne slurry was prepared as follows:

34 g of deionized water, 0.6 g of thickener (DeuRheo WT-105A), 0.03 g of hydroxyethyl cellulose and 0.77 g of waterborne wetting and dispersing agent (BYK156) were added into a dispersion tank and stirred at 300 r/min for 10 min. 48 g of cuprous oxide, 4 g of copper pyrithione (CuPT), 4 g of 4,5-dichloro-2-n-octyl-4-isothiazolin-3-one, 5.4 g of pigment/filler (1.8 g each of iron oxide red, zinc oxide and talc powder) and 3.2 g of organic bentonite were added in this order, and stirred and dispersed at 900 r/min for 30 min to yield a mixture. Then, a QM-3SP2 planetary ball mill was used to ball-mill the mixture until the slurry fineness was less than 50 μm, and the waterborne slurry was yielded with a TSC of 65 wt %.

A waterborne self-polishing antifouling paint was prepared as follows:

40 g of waterborne self-polishing emulsion, 41 g of waterborne slurry, 0.7 g of ethylene glycol butyl ether, and 17.5 g of deionized water were thoroughly stirred and dispersed at 300 r/min for 30 min to yield a mixture. Then, 0.3 g of waterborne leveling agent (DC57) and 0.5 g of waterborne defoamer (DA PRO AP7010) were slowly added to the mixture under stirring at 200 r/min. After the addition, the stirring and dispersing were continuously performed for 30 min to yield the waterborne self-polishing antifouling paint with a TSC of 46 wt %.

Example 4

A waterborne self-polishing emulsion and a waterborne slurry were prepared according to the method in Example 3.

35 g of waterborne self-polishing emulsion, 48 g of waterborne slurry, 0.6 g of ethylene glycol ethyl ether, and 15.5 g of deionized water were thoroughly stirred and dispersed at 300 r/min for 30 min to yield a mixture. Then, 0.3 g of waterborne leveling agent (BYK375) and 0.6 g of waterborne defoamer (DC65) were slowly added to the mixture under stirring at 200 r/min. After the addition, the stirring and dispersing were continuously performed for 30 min. The solution was filtered to yield the waterborne self-polishing antifouling paint with a TSC of 48 wt %.

Example 5

A waterborne self-polishing emulsion was prepared as follows:

45 g of silicon triisopropylmethacrylate, 15 g of butyl acrylate, 10 g of butyl methacrylate, 51.5 g of methyl methacrylate, 15 g of styrene, 5 g of vinylpyridine, and 3 g of acrylic acid were added and stirred well. 55 g of rosin was added, stirred and dissolved until a transparent solution was yielded. 4 g of non-ionic emulsifier (OP-10), 2 g of anionic emulsifier (cetyltrimethylammonium bromide) and 150 g of deionized water were added and stirred at 600 r/min and 30° C. for 40 min to yield a component A.

1.5 of initiator (ammonium persulfate) was added into 20 g of deionized water to dissolve to yield a component B.

0.25 g of sodium bicarbonate, 30 g of deionized water and 100 g of component A were added to a four-necked flask, and stirred at 600 r/min and 30° C. for 30 min. 3.3 g of component B was added, and gradually heated to 81° C. under stirring. After the reaction was allowed to take place for 40 min, a system turned blue. Then the stirring reaction was continued for 40 min to yield a seed emulsion.

The heating temperature was maintained at 81° C., and the remaining component A was added dropwise to the four-necked flask, and the addition was completed within 2 h. During this period, the remaining component B was continuously added in batches. After the components A and B were added, a reaction was incubated for 1 h at 81° C. After that, the temperature was raised to 88° C., and the reaction was further incubated for 1 h. After the reaction was completed, a yielded system was cooled to 55° C. About 0.5-1 g of 25% ammonia water was added dropwise to adjust the pH in the range of 6-8. Finally the solution was filtered to yield the waterborne self-polishing emulsion with a total solids content (TSC) of 48.1 wt %.

A waterborne slurry was prepared as follows:

36 g of deionized water, 0.6 g of thickener (DeuRheo WT-105A), 0.03 g of hydroxyethyl cellulose, and 0.77 g of waterborne wetting and dispersing agent (BYK156) were added into a dispersion tank and stirred at 300 r/min for 10 min. 46 g of cuprous oxide, 3.8 g of CuPT, 3.8 g of 4,5-dichloro-2-n-octyl-4-isothiazolin-3-one, 5.4 g of pigment/filler (1.8 g each of iron oxide red, zinc oxide and talc powder), and 3.6 g of organic bentonite were added in this order, and stirred and dispersed at 900 r/min for 30 min to yield a mixture. Then, a QM-3SP2 planetary ball mill was used to ball-mill the mixture until the slurry fineness was less than 50 μm, and the waterborne slurry was yielded with a TSC of 63 wt %.

A waterborne self-polishing antifouling paint was prepared as follows:

37 g of waterborne self-polishing emulsion, 45 g of waterborne slurry, 0.7 g of ethylene glycol butyl ether, and 16.5 g of deionized water were thoroughly stirred and dispersed at 300 r/min for 30 min to yield a mixture. Then, 0.3 g of waterborne leveling agent (WCT 2490) and 0.5 g of waterborne defoamer (DA PRO AP7010) were slowly added to the mixture under stirring at 200 r/min. After the addition, the stirring and dispersing were continuously performed for 30 min to yield the waterborne self-polishing antifouling paint with a TSC of 46.4 wt %.

Example 6

A waterborne self-polishing emulsion and a waterborne slurry were prepared according to the method in Example 5.

35 g of waterborne self-polishing emulsion, 48 g of waterborne slurry, 0.6 g of ethylene glycol ethyl ether, and 15.5 g of deionized water were thoroughly stirred and dispersed at 300 r/min for 30 min to yield a mixture. Then, 0.3 g of waterborne leveling agent (BYK375) and 0.6 g of waterborne defoamer (DC65) were slowly added to the mixture under stirring at 200 r/min. After the addition, the stirring and dispersing were continuously performed for 30 min. The solution was filtered to yield the waterborne self-polishing antifouling paint with a TSC of 47.1 wt %.

Characterization and Performance Testing

1. The waterborne self-polishing emulsions prepared in Examples 1, 3 and 5 were characterized.

FIG. 1 is an apparent view of the waterborne self-polishing emulsion in Example 1. It can be seen from FIG. 1 that the state of the waterborne self-polishing emulsion was uniform and no demulsification occurred.

FIG. 2 is an average particle size distribution diagram of an emulsion particle in the waterborne self-polishing emulsion in Example 1. It can be seen from FIG. 2 that the emulsion particle had an average particle size of about 180 nm.

FIG. 3 is a scanning electron microscope (SEM) image of the waterborne self-polishing emulsion in Example 1. It can be seen from FIG. 3 that the emulsion particle in the waterborne self-polishing emulsion was uniformly dispersed and had a uniform particle size.

The characterization diagrams of the waterborne self-polishing emulsions prepared in Examples 3 and 5 were basically the same as those in Example 1.

2. Performance Tests (1) The VOC content of the waterborne self-polishing antifouling paints prepared in Examples 1 to 6 was tested according to a method specified in GB18582-2008, the contents of which are incorporated by reference.

(2) The waterborne self-polishing antifouling paints prepared in Examples 1 to 6 were spray-coated on a surface of a substrate to form a paint film, and the performance tests of the paint film were performed as follows:

The adhesion of the paint film was tested according to a scratch method specified in GB1720-79.

The flexibility of the paint film was tested according to a method specified in GB1731-79.

The impact resistance of the paint film was tested according to a method specified in GB1732-79.

The polishing rate of the paint film was tested according to a method specified in GB/T 31411-2015.

The paint film was immersed in artificial seawater (prepared according to the conventional formula in the art) for 30 d (25° C.), and observed for blistering or falling off.

The performance test results are shown in Table 1.

TABLE 1

Performance test results of waterborne self-polishing antifouling paints prepared in Examples 1-6 and paint films formed thereby.

| Source of sample | Adhesion | Flexibility | Impact resistance | Immersed in artificial seawater for 30 d (whether there are blistering and falling off) | Average polishing rate | VOC |
|---|---|---|---|---|---|---|
| Example 1 | Class 1 | 1 mm | >50 kg · cm | None | 0.31 μm/d | 17.4 g/L |
| Example 2 | Class 1 | 1 mm | >50 kg · cm | None | 0.27 μm/d | 13.7 g/L |
| Example 3 | Class 1 | 1 mm | >50 kg · cm | None | 0.35 μm/d | 18.5 g/L |
| Example 4 | Class 1 | 1 mm | >50 kg · cm | None | 0.33 μm/d | 14.9 g/L |
| Example 5 | Class 1 | 1 mm | >50 kg · cm | None | 0.28 μm/d | 16.9 g/L |
| Example 6 | Class 1 | 1 mm | >50 kg · cm | None | 0.26 μm/d | 13.2 g/L |

3. The Antifouling Performance of the Waterborne Self-Polishing Antifouling Paint Prepared in Example 1 was Evaluated as Follows:

(1) The waterborne self-polishing antifouling paint prepared in Example 1 was spray-coated on a glass slide and cured at room temperature for 24 h to form an experimental sample, and a blank glass slide was used as a control sample. The experimental sample and the control sample were placed in a *Dunaliella* liquid. After 24 h, the amount of algae on a surface of the samples was observed under a fluorescence microscope, and the results are shown in FIG. 4. The left side of the figure shows the surface of the control sample, and the right side shows the surface of the experimental sample. A gray-white bright spot in the figure is *Dunaliella*. The scale of the figure is 50 μm. It can be seen from FIG. 4 that the density of *Dunaliella* on the surface of the experimental sample is obviously smaller than that of the control sample. This indicates that the waterborne self-polishing antifouling paint provided by Example 1 inhibited the growth and adhesion of *Dunaliella*.

(2) The waterborne self-polishing antifouling paint prepared in Example 1 was spray-coated on a surface of a low-carbon steel plate (200 mm×300 mm×2 mm) with an epoxy anticorrosive primer, and fully cured at room temperature for 2 d to form an experimental sample. A low-carbon steel plate of the same specification was covered with an epoxy anticorrosive primer and used as a control sample. The experimental and control samples were submerged at a depth of 1 m in the seawater for a static immersion test. The test period was from February 2019 to August 2019, and the test site was in the shallow water in Shenzhen Nan'ao.

The experimental and control samples were photographed on the $90^{th}$ and $180^{th}$ d of the static immersion test, and the surface morphology of the samples and the attachment of fouling organisms were observed. The results are shown in FIG. 5 ("10" and "06" in the figure represent the number of the samples and have no other special meanings). FIG. 5 shows that after 90 d of static immersion test in the shallow water, the surface of the control sample had a lot of fouling organisms, mainly barnacles and mussels, and the control sample was more seriously fouled. However, after 90 d of static immersion test in the shallow water, the paint film on the surface of the experimental sample was intact without blistering or falling off, and was clean. After 180 d of static immersion test in the shallow water, the surface fouling of the control sample was further aggravated, and a variety of fouling organisms attached to form fouling communities. However, the surface of the experimental sample was still clean, which showed excellent antifouling performance. It can be seen that during the test period, the waterborne self-polishing antifouling paint provided by the present invention had excellent antifouling performance and exhibited a wide range of antifouling effects.

The above descriptions are merely preferred implementations of the present invention. It should be noted that a person of ordinary skill in the art may further make several improvements and modifications without departing from the principle of the present invention, but such improvements and modifications shall also be deemed as falling within the protection scope of the present invention.

The invention claimed is:

1. A waterborne self-polishing antifouling paint, comprising the following components in parts by mass:
    30-60 parts of waterborne self-polishing emulsion, 30-70 parts of waterborne slurry, 0.1-0.5 parts of waterborne leveling agent, 0.2-1 parts of waterborne defoamer, 0.5-1 parts of film-forming additive and 10-20 parts of water, wherein the waterborne self-polishing emulsion is prepared from the following raw materials in percent by mass:
    5-30% of silicone acrylate monomer, 10-40% of vinyl unsaturated monomer, 0.2-2% of acrylic acid, 5-20% of rosin, 0.1-1% of initiator, 0.5-3% of emulsifier, 0.01-0.1% of sodium bicarbonate, 0.1-1% of pH adjuster, and the balance being water;
    wherein the waterborne slurry comprises an antifouling agent, a pigment/filler, an organic bentonite, a thickener, a waterborne wetting and dispersing agent, and water, in a mass ratio of (40-60):(5-10):(3-4):(0.5-1):(0.5-1):(30-40), respectively.

2. The waterborne self-polishing antifouling paint according to claim 1, wherein the vinyl unsaturated monomer comprises at least one of methyl methacrylate, butyl acrylate, butyl methacrylate, hydroxyethyl methacrylate, styrene, vinyl acetate and vinylpyridine.

3. The waterborne self-polishing antifouling paint according to claim 1, wherein the waterborne self-polishing emulsion has a pH of 6-8;
    an emulsion particle in the waterborne self-polishing emulsion has an average particle size of 150-200 nm.

4. The waterborne self-polishing antifouling paint according to claim 1, wherein the waterborne self-polishing emulsion is prepared by:
    mixing the silicone acrylate monomer, the vinyl unsaturated monomer, the acrylic acid, the rosin and the emulsifier with a first part of water to yield a component A;
    mixing the initiator with a second part of water to yield a component B;
    mixing the sodium bicarbonate, the remaining water, a part of the component A and a part of the component B to yield a first reaction solution, and subjecting the first reaction solution to a first emulsion polymerization reaction to yield a seed emulsion; and
    adding the remaining component A and the remaining component B dropwise to the seed emulsion to yield a second reaction solution, performing a second emulsion polymerization reaction to yield a system, and then adding the pH adjuster to the system to yield the waterborne self-polishing emulsion.

5. The waterborne self-polishing antifouling paint according to claim 2, wherein the waterborne self-polishing emulsion is prepared by:
    mixing the silicone acrylate monomer, the vinyl unsaturated monomer, the acrylic acid, the rosin and the emulsifier with a first part of water to yield a component A;
    mixing the initiator with a second part of water to yield a component B;
    mixing the sodium bicarbonate, the remaining water, a part of the component A and a part of the component B to yield a first reaction solution, and subjecting the first reaction solution to a first emulsion polymerization reaction to yield a seed emulsion; and
    adding the remaining component A and the remaining component B dropwise to the seed emulsion to yield a second reaction solution, performing a second emulsion polymerization reaction to yield a system, and then adding the pH adjuster to the system to yield the waterborne self-polishing emulsion.

6. The waterborne self-polishing antifouling paint according to claim 3, wherein the waterborne self-polishing emulsion is prepared by:
    mixing the silicone acrylate monomer, the vinyl unsaturated monomer, the acrylic acid, the rosin and the emulsifier with a first part of water to yield a component A;
    mixing the initiator with a second part of water to yield a component B;
    mixing the sodium bicarbonate, the remaining water, a part of the component A and a part of the component B to yield a first reaction solution, and subjecting the first reaction solution to a first emulsion polymerization reaction to yield a seed emulsion; and
    adding the remaining component A and the remaining component B dropwise to the seed emulsion to yield a second reaction solution, performing a second emulsion polymerization reaction to yield a system, and then adding the pH adjuster to the system to yield the waterborne self-polishing emulsion.

7. The waterborne self-polishing antifouling paint according to claim 1, wherein the antifouling agent comprises a main antifouling agent and an auxiliary antifouling agent; the main antifouling agent is cuprous oxide and/or copper powder; the auxiliary antifouling agent is one of more of copper pyrithione (CuPT), zinc pyrithione (ZPT), 4,5-dichloro-2-n-octyl-4-isothiazolin-3-one, 3-(3,4-Dichlorophenyl)-1,1-dimethylurea and zinc-ethylenebis(dithiocarbamate);

the pigment/filler comprises one or more of iron oxide red, zinc oxide, calcium carbonate, barium sulfate, mica powder, quartz powder and talc powder;

the thickener comprises hydroxyethyl cellulose.

8. The waterborne self-polishing antifouling paint according to claim 1, wherein the waterborne slurry is prepared by:

mixing the antifouling agent, the pigment/filler, the organic bentonite, the thickener, the waterborne wetting and dispersing agent and the water, and ball-milling to yield the waterborne slurry.

9. The waterborne self-polishing antifouling paint according to claim 7, wherein the waterborne slurry is prepared by:

mixing the antifouling agent, the pigment/filler, the organic bentonite, the thickener, the waterborne wetting and dispersing agent and the water, and ball-milling to yield the waterborne slurry.

10. The waterborne self-polishing antifouling paint according to claim 1, wherein the film-forming additive comprises ethylene glycol ethyl ether and/or ethylene glycol butyl ether.

11. A method for preparing the waterborne self-polishing antifouling paint according to claim 1, comprising:

mixing the waterborne self-polishing emulsion, the waterborne slurry, the waterborne leveling agent, the waterborne defoamer, the film-forming additive and the water to yield the waterborne self-polishing antifouling paint.

12. A method for preparing the waterborne self-polishing antifouling paint according to claim 2, comprising:

mixing the waterborne self-polishing emulsion, the waterborne slurry, the waterborne leveling agent, the waterborne defoamer, the film-forming additive and the water to yield the waterborne self-polishing antifouling paint.

13. A method for preparing the waterborne self-polishing antifouling paint according to claim 3, comprising:

mixing the waterborne self-polishing emulsion, the waterborne slurry, the waterborne leveling agent, the waterborne defoamer, the film-forming additive and the water to yield the waterborne self-polishing antifouling paint.

14. A method for preparing the waterborne self-polishing antifouling paint according to claim 4, comprising:

mixing the waterborne self-polishing emulsion, the waterborne slurry, the waterborne leveling agent, the waterborne defoamer, the film-forming additive and the water to yield the waterborne self-polishing antifouling paint.

15. A method for preparing the waterborne self-polishing antifouling paint according to claim 7, comprising:

mixing the waterborne self-polishing emulsion, the waterborne slurry, the waterborne leveling agent, the waterborne defoamer, the film-forming additive and the water to yield the waterborne self-polishing antifouling paint.

16. The waterborne self-polishing antifouling paint according to claim 1, wherein said paint is a marine antifouling paint.

17. The method according to claim 11, wherein said paint is a marine antifouling paint.

* * * * *